United States Patent [19]

Sohnle

[11] 4,226,134
[45] Oct. 7, 1980

[54] BELT PULLEY

[75] Inventor: Rüdiger Sohnle, Stuttgart, Fed. Rep. of Germany

[73] Assignee: Robert Bosch GmbH, Stuttgart, Fed. Rep. of Germany

[21] Appl. No.: 5,486

[22] Filed: Jan. 22, 1979

[30] Foreign Application Priority Data

Feb. 27, 1978 [DE] Fed. Rep. of Germany ....... 2808332

[51] Int. Cl.³ ............................................ F16H 55/36
[52] U.S. Cl. .................................. 474/181; 29/159.3; 474/903
[58] Field of Search ............ 74/230.14, 230.11, 230.3, 74/230.13, 230.8, 230.4; 403/96, 367, 368, 370; 29/159.2, 159.3

[56] References Cited

U.S. PATENT DOCUMENTS

| 614,166 | 11/1898 | Fox | 29/159.3 |
| 3,174,348 | 3/1965 | Luenberger | 74/230.3 |
| 3,286,539 | 11/1966 | Loper et al. | 74/230.4 |

FOREIGN PATENT DOCUMENTS

| 2370203 | 6/1978 | France | 74/230.3 |
| 7708686 | 8/1977 | Netherlands | 74/230.8 |
| 15729 | of 1891 | United Kingdom | 74/230.3 |

*Primary Examiner*—C. J. Husar
*Assistant Examiner*—Conrad Berman
*Attorney, Agent, or Firm*—Frishauf, Holtz, Goodman, Woodward

[57] ABSTRACT

To lower the cost and weight of a belt pulley and permit its installation without the use of large numbers of spacer discs, the belt pulley is composed of two substantially identical stamped sheet metal halves which are so configured as to define a hub region when assembled. One or both of the pulley halves may be provided with a radially inwardly extending nose which engages a key-way in the shaft on which it is mounted, thereby preventing relative rotation of pulley and shaft.

6 Claims, 1 Drawing Figure

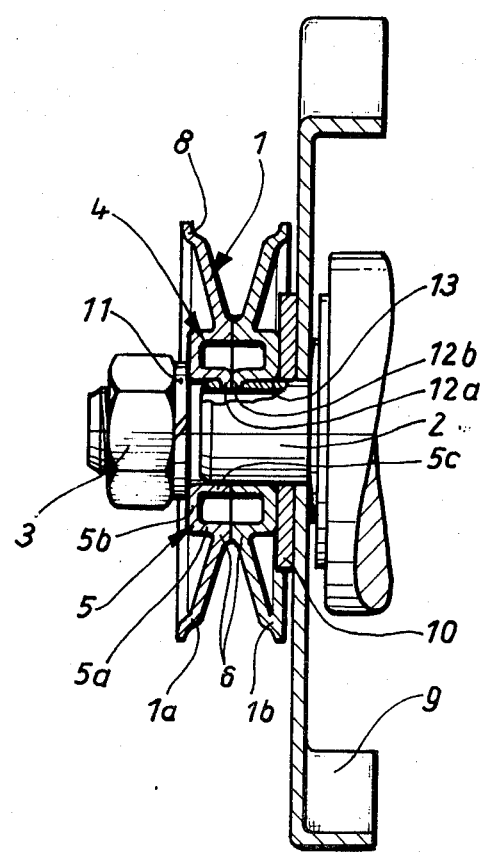

BELT PULLEY

FIELD OF THE INVENTION

The invention relates to a belt pulley having an outer belt carrying groove and an inner hub for attachment to a rotating shaft, especially for use with electrical machinery in motor vehicles.

BACKGROUND AND PRIOR ART

Belt pulleys which are constructed from two separate pulley halves are known. It is a disadvantageous feature of the known belt pulleys that the concentric end surfaces through which the shaft passes are substantially flat so that the attachment of the pulley on the shaft requires the use of a, sometimes large, number of shims or spacer discs. Moreover, the area of contact between the inside of the hole of the pulley and the outside surface of the shaft is relatively small so that only relatively weak frictional forces come into play and the pulley must be held on the shaft almost exclusively due to forces exerted by the lock nut which exerts axial force on the hub of the pulley, thereby holding it in position. A particular disadvantage of this manner of fastening the pulley is that when the nut is tightened, the pulley may be rotated with respect to the shaft unless special devices are provided to prevent such relative rotation. Such rotation is undesirable because the belt pulleys are often required to maintain angular alignment with the shaft and may carry markings which must be placed in a particular relation with respect to other parts of the machinery.

THE INVENTION

It is thus a principal object of the present invention to provide a belt pulley which is simple and relatively inexpensive to manufacture and yet has the advantages of including a hub portion that provides broad and large-area contact with the associated shaft and which permits mounting on the shaft without a large number of spacer discs or shims. As associated object of the invention is to provide a pulley in which the elements that prevent relative rotation of the pulley on the shaft are incorporated in the pulley itself.

Briefly, the belt pulley is constructed of substantially identical, stamped pulley halves in which the hub portion is formed by inner bulges applied to each of the two pulley halves. When the two pulley halves are joined, the cooperating bulges define a substantially toroidal surface which constitutes the hub portion of the belt pulley. This construction permits the mounting of the pulley on the shaft without excessive force and without attendant imbalance effects and provides a secure seating of the pulley without the application of necessarily high axial pressures to secure the pulley on the shaft as has been heretofore necessary.

In a particularly advantageous feature of the invention, the hub region of the pulley extends symmetrically in both axial directions to the vicinity of the transverse planes defined by the outer edges of the belt-carrying portion of the pulley so that the pulley may be mounted on the shaft with at most one spacer disc or washer on each side of the pulley. In a still further advantageous feature of the invention, the hub portion of the pulley carriers protrusions extending radially inwardly which engage appropriate features of the shaft to prevent the relative rotation of the pulley on the shaft.

The invention will now be described by way of a preferred exemplary embodiment, taken with reference to the accompanying drawing.

THE DRAWING

The single FIGURE of the drawing is a partially sectional side view of a pulley constructed according to the invention mounted on the end of the shaft of associated machinery.

DESCRIPTION OF THE PREFERRED EMBODIMENT

The preferred example illustrated in the single figure is that of a V-belt pulley mounted on the end of the shaft of an associated A.C. or D.C. generator for motor vehicles. However, it will be understood that the belt pulley constructed according to the present invention is of utility and may be advantageously employed for all instances of belt pulleys on shafts, spindles, ends of shafts, and the like, i.e., wherever it is intended to transmit rotation from one shaft to another by the use of belts of any desirable cross section. In the exemplary embodiment illustrated, the belt pulley 1 is mounted on the end of a shaft 2 belonging to a torque-generating or torque-receiving electrical machine, for example, an A.C. generator on which it is fastened by means of a nut 3. The belt pulley 1 is constructed of substantially identical pulley halves 1a and 1b which may, for example, be stamped by deep-drawing from a suitable piece of material. The belt groove defined by the outer regions of the belt halves 1a and 1b may be of any suitable shape, and it is illustrated as a V-belt groove for the particular example shown. A significant feature of the present invention is that the belt pulley formed by the two belt pulley halves 1a and 1b defines a hub region 4 which is formed by the cooperation of bulges 5 which are imparted to each of the pulley halves during the deep-drawing or stamping. Each of the bulges 5 in each of the pulley halves has a substantially U-shaped cross section defined by three regions. A first region 5a extending approximately perpendicularly from the plane of the pulley is joined by a second base portion 5b which is substantially parallel to the plane of the pulley. This base portion 5b joins an inner rim 5c at substantially right angles. When the two pulley halves, which are substantially identical, are joined in the logical manner, as illustrated in the figure, the two bulges 5 form a hollow hub region which is constituted by a hollow toroidal surface with substantially flat walls formed by the various hub regions 5a, 5b, 5c. The mutually adjacent edge areas of the two pulley halves are preferably flat so that, when the pulley halves are abutted and joined, the overall structure obtained is a pulley with a closed hollow hub region. The axially outermost portion of the hub region 5, i.e., those parts formed by the regions 5b, may extend axially as far as necessary, i.e., short of the plane defined by the outer edges 8 of the pulley or extending beyond that plane. The outer surfaces defined by the regions 5b are subjected to the axial pressure exerted by the mounting nut 3 and the inner cylindrical surface defined by the hub regions 5c forms a continuous surface that makes form-fitting contact with the outer surface of the shaft, permitting a substantially perpendicular orientation of the pulley on the shaft without play or twist.

In the embodiment shown, the belt pulley and an associated fan wheel 9 are mounted together on the end of the shaft of the machine and are separated from each other by a spacer disc 10. A further spacer or washer 11 is disposed between the outer part of the hub 5 and the lock nut 3.

In a further advantageous feature of the present invention, each of the pulley halves 1a and 1b is provided with radially inwardly extending protrusions 12a, 12b, during the manufacture of the pulley halves. These protrusions 12a and 12b engage an outer axial groove 13 on the shaft 2 so that any relative rotation of the pulley on the shaft is effectively prevented, especially during the tightening of the nut 3 but also whenever substantial peak torques are applied to the pulley. The presence of the groove-engaging protrusions 12a and 12b makes it possible to dispense with Woodruff keys or spring discs or the like.

The belt pulley according to the present invention, which is preferably constructed of two mating parts made of sheet metal of equal thickness is substantially less costly to manufacture and is lighter than belt pulleys in which the hub portion is made of solid metal. The belt pulley according to the present invention which is constructed from two stamped halves of a configuration substantially as described provides a pulley of great inherent structural rigidity, especially in the region of the hub, which is fully able to meet the requirements of even heavy-duty service.

The axially extending partial regions 5a, 5c can have a suitable length in accordance with the desired use, so that the central partial regions 5b of the hub region 4 will come to lie in a plane which is farther from the central plane of symmetry of the pulley than is the plane defined by the outer edges of the belt-carrying region 8; or, for some constructions, when it is desired to operate with washers or shims, the central partial region 5b of the hub region 4 can lie in a plane which is closer to the central plane of symmetry than is the plane defined by the outer edges of the belt-carrying region 8.

The foregoing relates to a merely preferred exemplary embodiment of the invention, it being understood that various changes and modifications may be made therein within the scope of the inventive concept.

I claim:

1. A belt pulley including a hollow hub region having a central opening for receiving a shaft and an outer beltcarrying region, said belt pulley being formed by mating juxtaposition of two substantially identical pulley halves, each of said pulley halves (1a, 1b) having an inner bulge in contact with the inner bulge of the other defining said hub region;
   wherein said bulges in each of said pulley halves (1a, 1b) includes
   a first, outer axially extending surface (5a) attached to said outer belt-carrying region, the first axially extending annular surface, having first end portions in contact with each other,
   a second diametrically extending outer annular surface (5b), the outer edge of which is connected to the second end portions of said first annular surface (5a) and which extends in a plane substantially parallel to the plane of the pulley, and a cylindrical axially extending inner annular surface (5c), one edge of which is connected to said second annular surface (5b), said cylindrical inner annular surfaces (5c) of said halves being in contact with and abutting against each other, being substantially coaxial with a shaft and defining the opening for a shaft in said hub region.

2. A belt pulley according to claim 1, wherein the partial surface regions (5a, 5b, 5c) of the bulges in said pulley halves (1a, 1b) are substantially plane surfaces to form, when said pulley halves are matingly juxtaposed a hollow toroidal surface with substantially rectangular cross section.

3. A belt pulley according to claim 2, wherein the inside diameters of the cylindrical surfaces (5c) are substantially equal to the outer diameter of a shaft received therein to firmly seat said belt pulley on a shaft.

4. A belt pulley according to claim 3, wherein the central partial regions (5b) of said hub region (4) lie in a plane which is closer to the central plane of symmetry of said pulley than is the plane defined by the outer edges of said belt-carrying region.

5. A belt pulley according to claim 3, wherein the central partial regions (5b) of said hub region (4) lie in a plane which is farther from the central plane of symmetry of said pulley than is the plane defined by the outer edges of said belt-carrying region.

6. A belt pulley according to claim 1, wherein each of said pulley halves is provided with radially inwardly projecting extensions (12a, 12b) for engagement of said extensions (12a, 12b) in an outer recess (13) on a shaft adapted to be received in the central opening of said hub region.

* * * * *